United States Patent
Petersen (10) Patent No.: US 10,617,114 B1
(45) Date of Patent: Apr. 14, 2020

(54) DECOY SLED

(71) Applicant: Tony C. Petersen, Spirit Lake, IA (US)

(72) Inventor: Tony C. Petersen, Spirit Lake, IA (US)

( * ) Notice: Subject to any disclaimer, the term of this patent is extended or adjusted under 35 U.S.C. 154(b) by 220 days.

(21) Appl. No.: 15/707,338

(22) Filed: Sep. 18, 2017

(51) Int. Cl.
*A01M 31/00* (2006.01)
*A01M 31/06* (2006.01)
*E04H 1/12* (2006.01)
*E04B 1/343* (2006.01)
*A01M 31/02* (2006.01)

(52) U.S. Cl.
CPC ......... *A01M 31/06* (2013.01); *E04B 1/34384* (2013.01); *E04H 1/1205* (2013.01); *A01M 31/025* (2013.01); *E04B 2001/34389* (2013.01)

(58) Field of Classification Search
CPC ... A01K 1/0035; A01M 31/025; A01M 31/06; E04H 15/00; E04H 15/001; E04B 1/34357; E04B 1/344
USPC ........ 43/2; 119/482, 512, 519; 280/18.1, 19, 280/19.1, 20, 8, 9; 52/143
See application file for complete search history.

(56) References Cited

U.S. PATENT DOCUMENTS

| | | | | |
|---|---|---|---|---|
| 1,148,948 A | * | 8/1915 | Benjamin | B65D 29/00 383/121.1 |
| 2,301,089 A | * | 11/1942 | Stevens | E04H 15/001 135/116 |
| 3,428,026 A | * | 2/1969 | Sohmers | A01K 1/033 119/452 |
| 3,464,735 A | * | 9/1969 | Smith | B60P 3/341 135/116 |
| 3,826,270 A | * | 7/1974 | Hentges | E04H 15/001 280/19.1 |
| 3,924,871 A | * | 12/1975 | Mesenbring | B62B 13/16 280/845 |
| 3,971,395 A | * | 7/1976 | Lipinski | E04H 1/12 280/19.1 |
| 4,139,208 A | * | 2/1979 | Kaley | B62B 13/18 280/9 |
| 4,917,127 A | * | 4/1990 | Marble | E04H 15/003 135/87 |
| 5,222,748 A | * | 6/1993 | Johnson | B62B 3/02 280/19.1 |
| 5,341,588 A | * | 8/1994 | Lizotte | A01K 97/01 135/901 |
| 5,701,705 A | * | 12/1997 | Davis | A01K 1/00 52/68 |
| 7,997,291 B2 | * | 8/2011 | Gressette, III | A01M 31/02 135/117 |
| 9,303,424 B1 | * | 4/2016 | Galloway | E04H 15/001 |
| 9,303,425 B1 | * | 4/2016 | Galloway | A01M 31/025 |

(Continued)

*Primary Examiner* — David J Parsley
*Assistant Examiner* — Danielle A Clerkley
(74) *Attorney, Agent, or Firm* — Dennis L. Thomte; Thomte Patent Law Office LLC (57) ABSTRACT

A decoy sled having a folding wall system which is secured thereto so as to be selectively movable between a folded position within the decoy sled to an upright position. The folding wall system includes a front wall member, a first side wall member which extends rearwardly from one end of the front wall member, a second side wall member which extends rearwardly from the outer end of the front wall member and a rear wall member which extends between the rear ends of the first and second side wall member. A plurality of storage pockets, having open upper ends, are associated with the folding wall system.

20 Claims, 8 Drawing Sheets

(56) References Cited

U.S. PATENT DOCUMENTS

| | | | | |
|---|---|---|---|---|
| 2007/0068094 A1* | 3/2007 | Fralish | ................ | A01K 1/0035 52/143 |
| 2008/0066794 A1* | 3/2008 | Durfee | ................ | A01M 31/025 135/96 |
| 2013/0146113 A1* | 6/2013 | Hawk, III | ........... | A01M 31/025 135/143 |

* cited by examiner

DECOY SLED

BACKGROUND OF THE INVENTION

Field of the Invention

This invention relates to a decoy or sport sled which may be used to pull or drag hunting gear, decoys, etc. to a hunting location. Even more particularly, this invention relates to a decoy sled having a flexible wall system which may be moved from a collapsed or folded position within the sled to an upright position defining an open upper end. The hunting gear and decoys may be placed into the sled and the interior of the wall system.

Description of the Related Art

Decoy or sport sleds have long been used by hunters to place hunting gear such as decoys, guns, etc. therein and then drag or pull the sled to a body of water or a field where the decoys will be set up. In most cases, the prior art sleds include a bottom, a front wall, a rear wall, a first side wall and a second side wall. A tow rope is usually secured to the front end of the sled to enable a hunter to drag or pull the sled to the desired hunting location. Inasmuch as the sleds of the prior art had a limited space to place the hunting gear and decoys therein, one prior art sled had a bag positioned on the sled. Inasmuch as the bag was flexible, the bag had to be manually held in an upright open position to enable the hunting gear and decoys to be placed therein. Other prior art decoy sleds have an upstanding wall system which was held in an upright position by support poles. The support poles of those decoy sleds had to be removed from the wall system before the wall system could be collapsed. In such a case, there was no convenient means for storing the support poles.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A decoy sled is described which includes a generally rectangular sled member having an upstanding front wall, an upstanding rear wall, an upstanding first side wall and an upstanding second side wall which defines an interior. The sled member includes a towing device extending from the forward end thereof.

An elongated first support post, having upper and lower ends, has its lower end pivotally secured to the inner side of the first side wall at the front end of the first side wall. The first support post is selectively pivotally movable between an upright position to a folded position in the interior of the sled member. The sled member also includes an elongated second post having upper and lower ends with the lower end of the second support post being pivotally secured to the inner side of the first side wall at the rear end of the first side wall. The second support post is selectively pivotally movable between an upright position to a folded position in the interior of the sled member. The sled member also includes an elongated third support post, having upper and lower ends, with the lower end of the third support post being pivotally secured to the inner side of the second wall at the front end of the second side wall. The sled member further includes an elongated fourth support post, having upper and lower ends, with the lower end of the fourth support post being pivotally secured to the inner side of the second side wall at the rear end of the second side wall. The fourth support post is selectively pivotally movable between an upright position to a folded position in the interior of the sled member.

An elongated first support member is secured to the upper ends of the first and second support posts and extends therebetween. An elongated second support member is secured to the upper ends of the third and fourth support posts and extends therebetween. The decoy sled of this invention includes a flexible wall system which extends around the support posts and which includes a front wall member, a first side wall member, a second side wall member and a rear wall member. The front wall member of the wall system extends between the first and third support posts with the rear wall member of the wall system extending between the second and fourth support posts.

The first side wall member of the wall system extends between the first and second support posts and the second side wall member of the support system extends between the third and fourth support posts. The wall system forms an upward extension of the front wall, the first side wall, the second side wall and the rear wall of the sled member when the first, second, third and fourth support posts are in their upright position. The wall system is in a folded position in the interior of the sled member when the first, second, third and fourth support posts are in their folded position. The decoy sled of the invention also includes structure for maintaining the support posts in their upright position.

In the preferred embodiment of the invention, a weather resistant pocket is positioned at the outer side of the rear wall member of the wall system and a weather resistant pocket is positioned at the inner side of the front wall member of the wall system. Further, in the preferred embodiment of the invention, a weather resistant pocket is positioned at the inner side of the first side wall member of the wall system and a weather resistant pocket is positioned at the inner side of the second wall member of the wall system. The side wall members of the wall system are capable of supporting fully assembled spinning wing decoys at the outer sides thereof. The pockets associated with the wall system enables clothing, gear, blind materials, game bags, harvested game, etc. to be placed therein. The outer sides of the side wall members of the wall system have supports associated therewith for supporting guns or gun cases thereon.

It is therefore a principal object of the invention to provide an improved decoy sled.

A further object of the invention is to provide a decoy sled which includes a wall system which extends upwardly from the sled member which may be folded into the interior of the sled member.

A further object of the invention is to provide a decoy sled which is capable of supporting fully assembled spinning wing decoys thereon.

A further object of the invention is to provide a decoy sled which includes pockets capable of receiving silhouette decoys therein.

A further object of the invention is to provide a wall system for attachment to a decoy sled member which has weather resistant pockets associated therewith which are configured to have clothing, gear, blind materials, game bags, harvested game, etc. to be placed therein.

Yet another object of the invention is to provide a wall system of the type described which is capable of having guns or gun cases secured to the outer sides of the side wall members of the wall system.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The decoy sled of this invention is referred to generally by the reference numeral 10. Decoy sled 10 includes a sled member 11. Sled member 11 includes a front wall 20 having a first end 22, a second end 24, an upper end 26 and a lower end 28. Sled member 11 also includes a first side wall 30 having a front end 32, a rear end 34, an upper end 36, and a lower end 38. Sled member 11 further includes a second side wall 40 having a front end 42, a rear end 44, an upper end 46 and a lower end 48. Sled member 11 also includes a rear wall 50 having a first end 52, a second end 54, an upper end 56 and a lower end 58. A bottom wall 60 extends between the lower ends of front wall 20, first side wall 30, second side wall 40 and rear wall 50. Usually, front wall 20 will be angled or inclined so as to more easily pull or drag the sled member 11 from one location to another. Further, the upper ends of front wall 20, first side wall 30, second side wall 40 and rear wall 50 have a horizontally disposed flange 61 extending outwardly therefrom.

Decoy sled includes an elongated first support post 62 having a lower end 64 and an upper end 66. The lower end 64 of support post 62 is pivotally secured to a pivot bracket 68 which is mounted on the inner side of side wall 30 at the front end 32 thereof. The numeral 70 refers to an elongated second support post having a lower end 72 and an upper end 74. The lower end of support post 70 is pivotally secured to a pivot bracket 76 which is mounted on the inner side of side wall 30 at the rear end 34 thereof. The numeral 78 refers to an elongated third support post having a lower end 80 and an upper end 82. The lower end 80 of support post 78 is pivotally secured to a pivot bracket 84 which is mounted on the inner side of side wall 40 at the front end 42 thereof. The numeral 86 refers to an elongated fourth support post having a lower end 88 and an upper end 90. The lower end 88 of support post 86 is pivotally secured to a pivot bracket 92 which is mounted on the inner side of side wall 40 at the rear end 44 thereof.

An elongated support member 94 having a front end 96 and a rear end 98 is secured to and extends between the upper end 66 of support post 62 and the upper end 74 of support post 70. If so desired, support posts 62 and 70 and support member 94 could be of three-piece construction.

An elongated support member 100 having a front end 102 and a rear end 104 is secured to and extends between the upper end 82 of support post 78 and the upper end 90 of support post 86. If so desired, support posts 78 and 86 and support member 100 could be of three-piece construction.

The support posts 62, 70, 78 and 86 are selectively pivotally movable between an upright position to a folded position in the interior of sled member 11. When the support posts 32 and 78 are in their upright positions, an elongated brace 106 is employed to maintain the support posts 32 and 78 in the upright position. Brace 106 includes a semi-circular connector 108 at one end thereof and a semi-circular connector 110 at the other end thereof which may be snapped onto the support posts 62 and 78 respectively. When the support posts 70 and 86 are in their upright position, a brace identical to brace 106 will be extended therebetween in the same manner as brace 106 functions.

Figure 1:
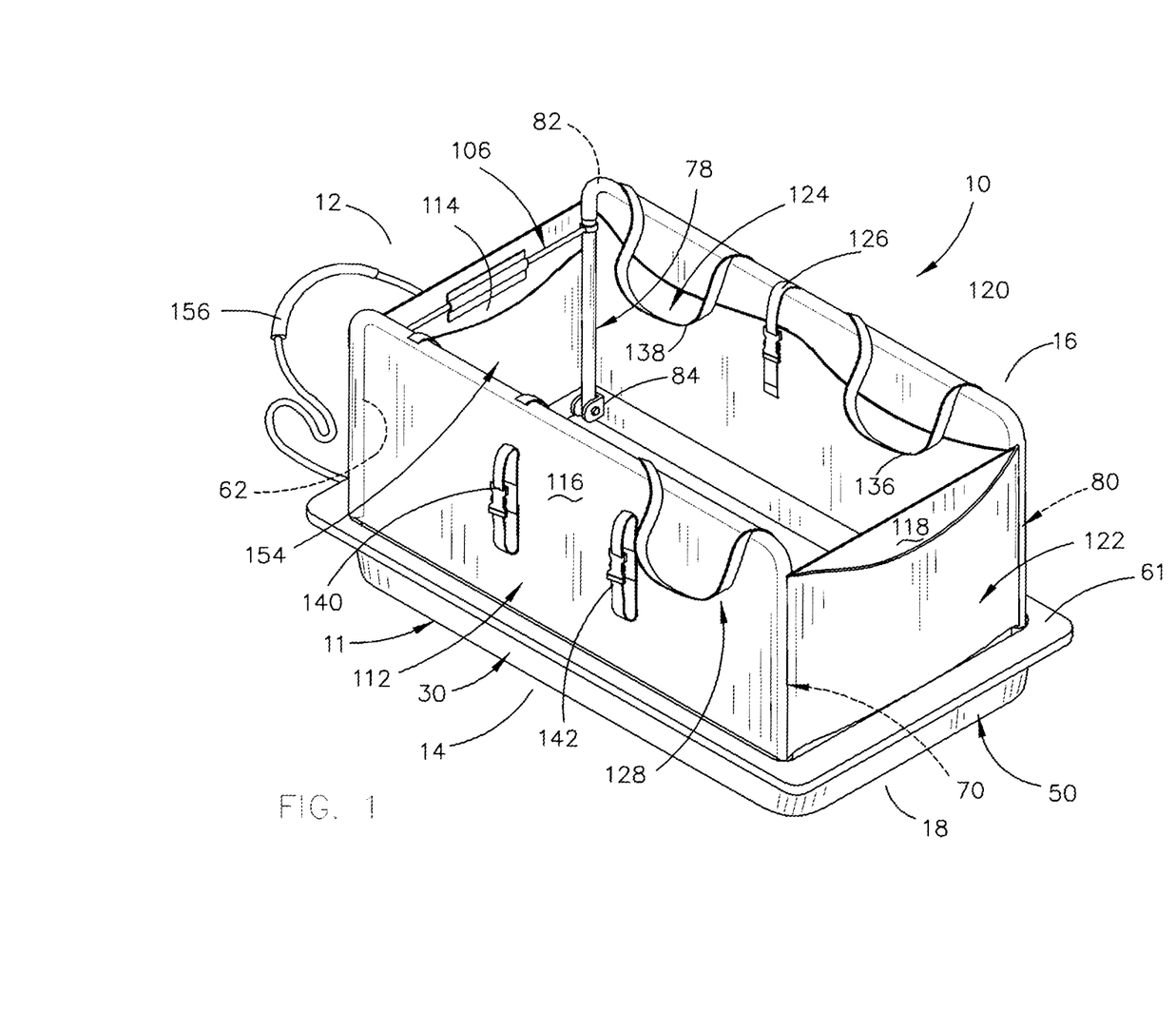
FIG. 1 is a rear perspective view of the decoy sled of this invention with the wall system of the invention being in an upright position.
Figure 2:
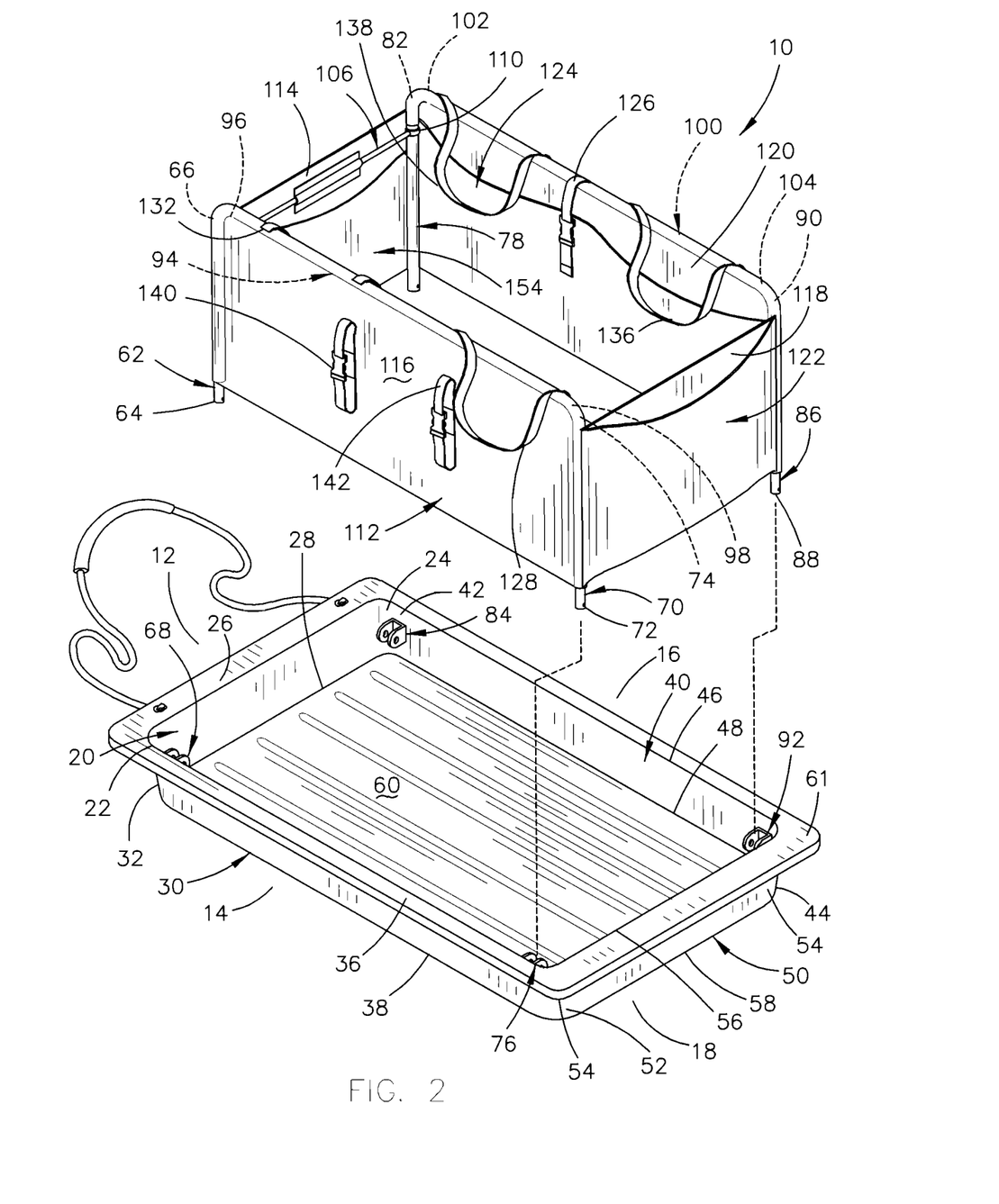
FIG. 2 is a rear exploded perspective view of the decoy sled of this invention.
Figure 3:
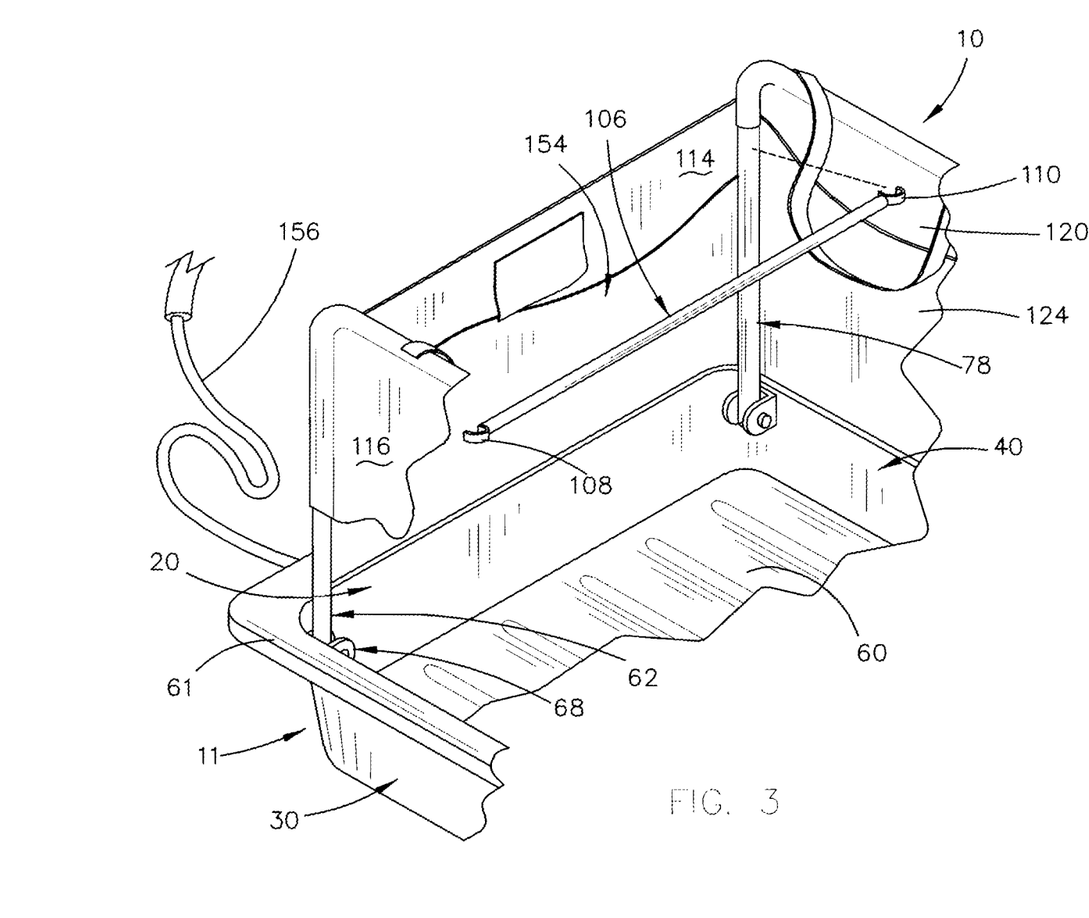
FIG. 3 is a partial rear perspective view of the decoy sled of this invention with a portion of the sled and wall system being cut-away to more fully illustrate the invention.

The numeral 112 refers to a flexible and collapsible wall system which extends around the support posts 62, 70, 86 and 78 and which drapes over the support member 94 and 100 as seen in the drawings. The wall system 112 may be of one-piece construction or multiple-piece construction. Wall system 112 includes a front wall section 114, a first side wall section 116, a rear wall section 118 and a second side wall section 120. As seen, front wall section 114 extends between support posts 62 and 78 and the first side wall section 116 extends between support posts 62 and 70. Rear wall section 118 extends between support posts 70 and 86 while the second side wall section extends between support posts 86 and 78. As seen, the upper end of the front side wall section extends over the support member 94 and the upper end of the second side wall section extends over the support member 100. A pocket 122, having an open upper end, is positioned at the outer side of rear wall section 118. A pocket 124, having open upper ends, is positioned at the inside surface of side wall section 120. A support strap 126 supports the upper end of pocket 124 as seen in FIG. 2. Pocket 124 is configured to receive decoys such as silhouettes therein or other items.

A U-shaped strap 128 has its upper ends secured to the upper end of side wall section 116 of wall system 112 for supporting a fully assembled spinning wing decoy 130 therein at the outer side of side wall section 116. A U-shaped strap 132 has its upper ends secured to the upper end of side wall section 116 of wall system 112 for supporting a fully assembled spinning wing decoy 134 therein at the outer side of side wall section 116. U-shaped straps 136 and 138 are also provided at the outer side of wall section 120 for supporting fully assembled spinning wing decoys therein.

A pair of support straps 140 and 142 are mounted on the outer side of side wall section 116 for supporting a shot gun or gun case 148 therein. A pair of support straps 144 and 146 are mounted on the outer side of wall section 120 for supporting a shot gun or gun case 148 therein.

Figure 6:
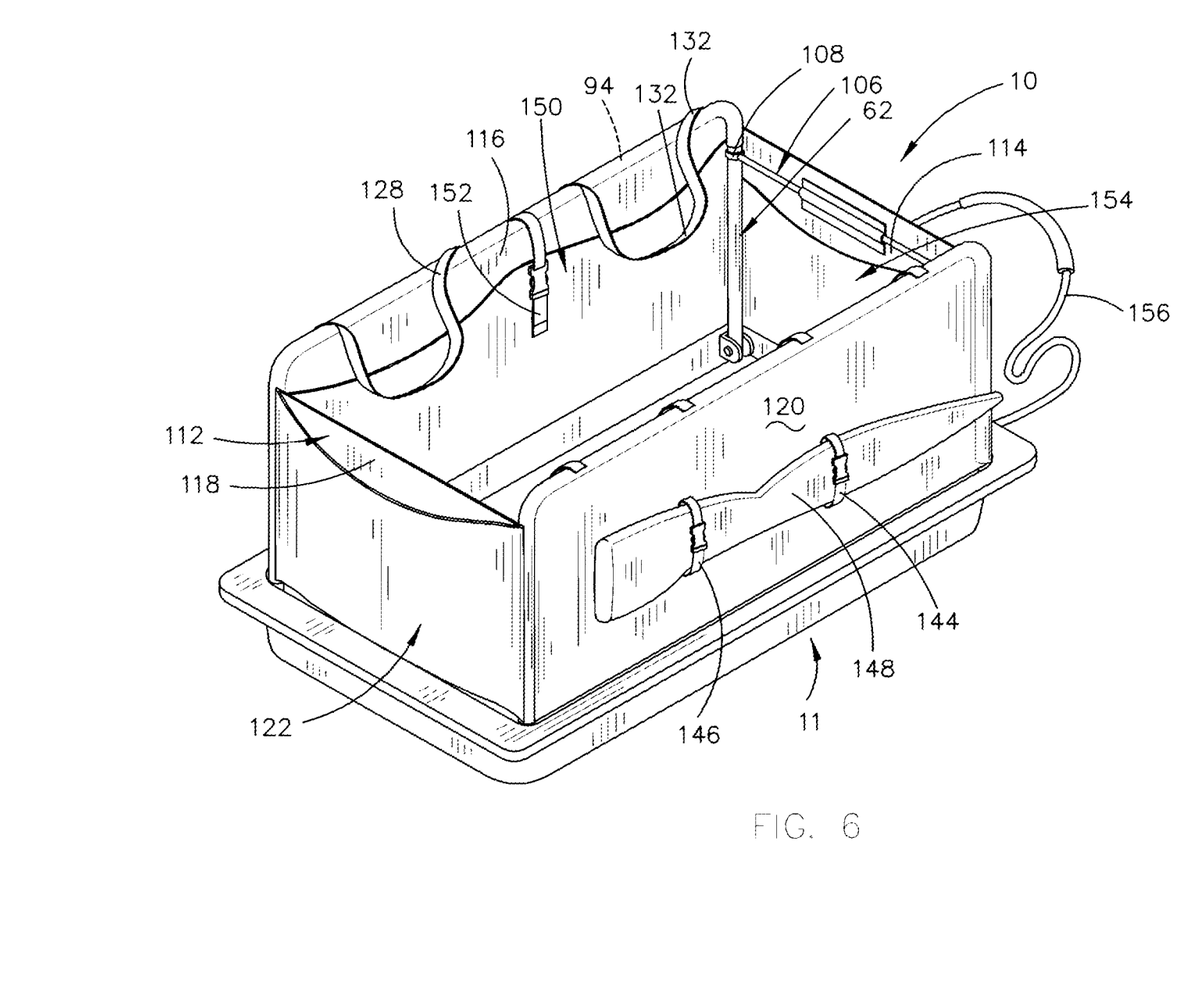
FIG. 6 is a perspective view of the decoy sled of this invention which illustrates a gun case mounted on the exterior of the outer side wall of the wall system of this invention.

A pocket 150 having an open upper end is positioned at the inner side of wall section 116 as seen in FIG. 6. A strap 152 supports the upper end of pocket 150 as seen in FIG. 6. A pocket 154 having an open upper end is positioned at the inner side of front wall section 114 of wall system 112.

Figure 7:
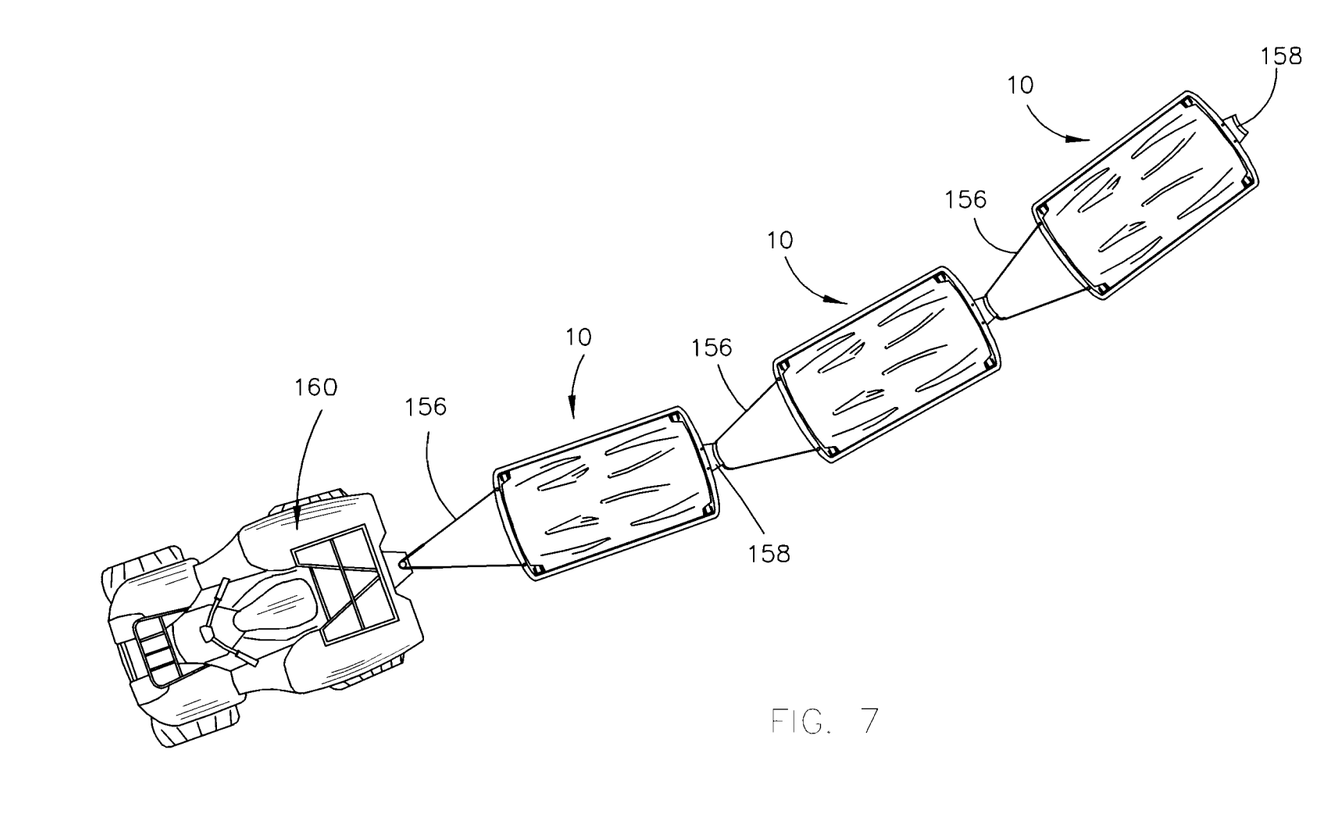
FIG. 7 is a top view of a plurality of the decoy sleds of this invention being pulled by an ATV.

A tow rope 156 is secured to the front end of sled member 11. If it is desired to pull or tow a plurality of the sleds 10 in an end-to-end fashion as seen in FIG. 7, a hitch 158 is secured to the rear end of sled member 11 which receives the tow rope 156 of a trailing sled. The numeral 160 refers to an ATV for towing the sleds 10 as seen in FIG. 7.

When the wall system 112 is in its upright position, the fully assembled spinning wing decoys 130 and 134 may be positioned at the outer side of side wall member 116. A gun or gun case may be positioned in the straps 140 and 142 and a gear or gun case 148 may be positioned in the straps 144 and 146. Clothing, gear, blind materials, game bags, harvested game, blind bags, etc. may be positioned in the various weather resistant pockets 122, 124, 150 and 154.

Figure 8:
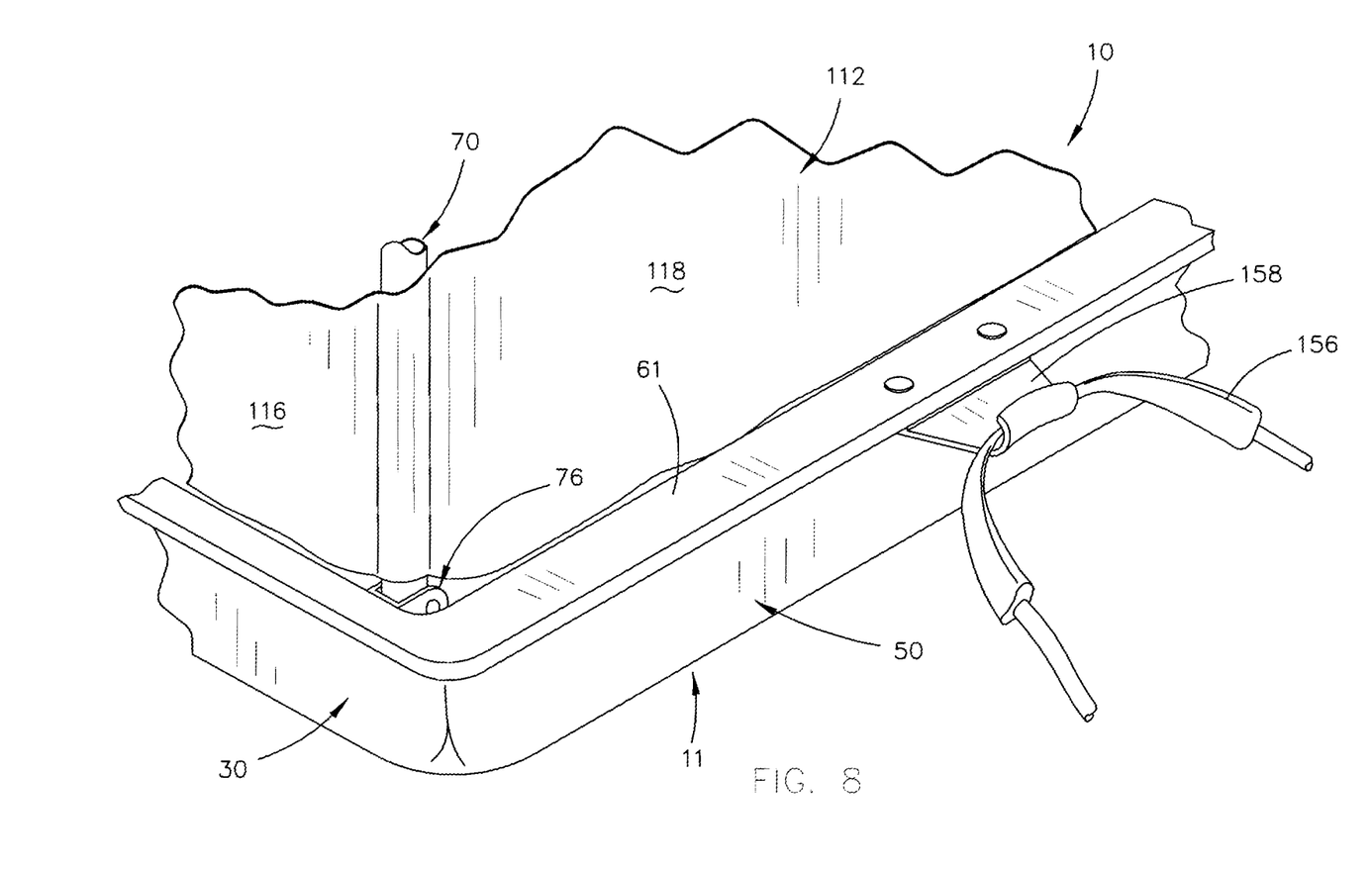
FIG. 8 is a partial rear perspective view of the rear end of the decoy sled which illustrates the manner in which the decoy sleds may be connected together in an end-to-end manner such as seen in FIG. 7.

The sled 10 may be pulled to the desired hunting location either manually or with an ATV 160. A plurality of the sleds 10 may be pulled to the desired hunting position in an end-to-end manner as previously described and as shown at FIGS. 7 and 8.

Figure 4:
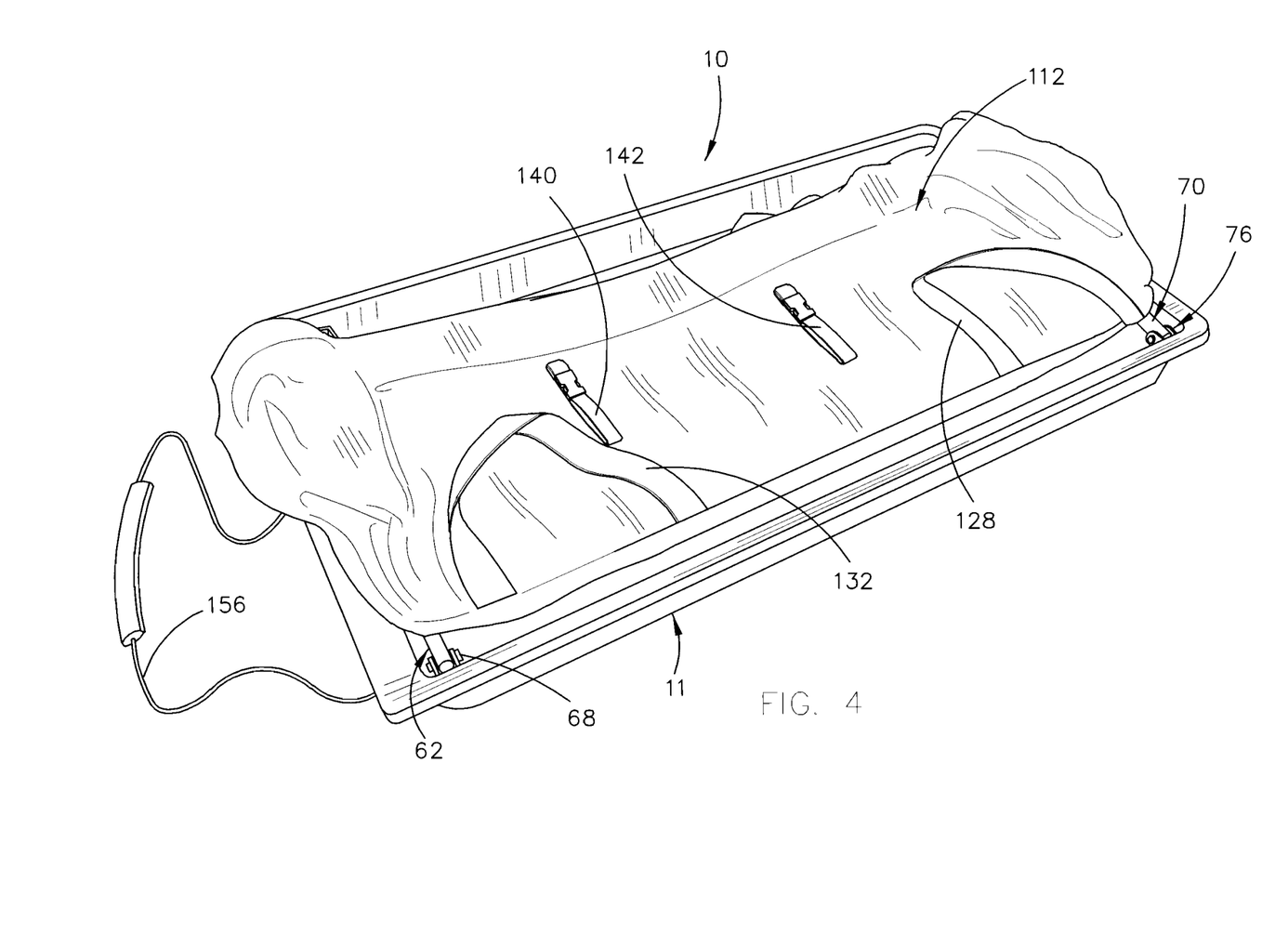
FIG. 4 is an upper perspective view of the decoy sled of the invention with the wall system of the invention being in a folded or collapsed position within the sled.
Figure 5:
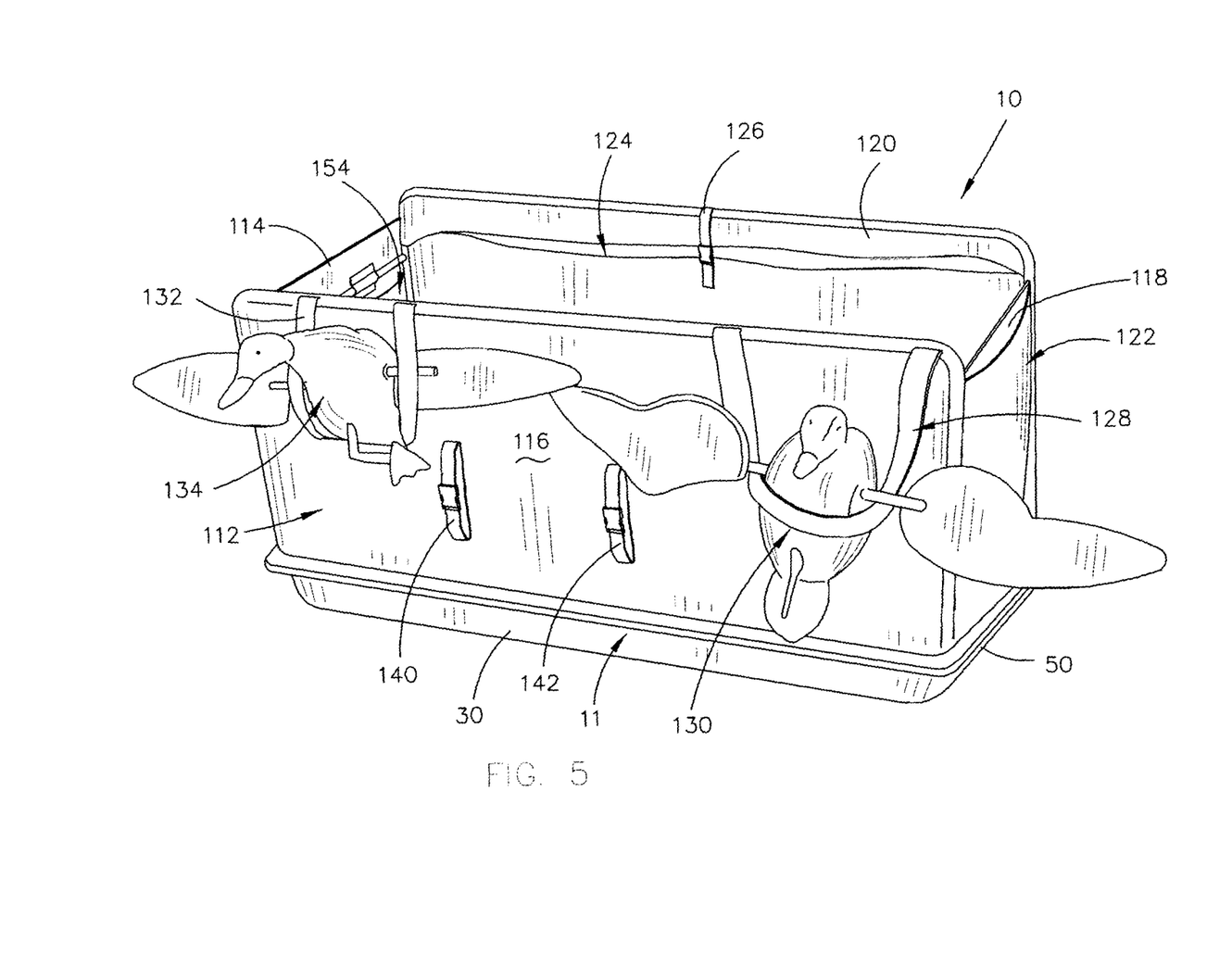
FIG. 5 is a side perspective view of the decoy sled of this invention and which illustrates a pair of spinning wing decoys mounted on the exterior of one side wall of the wall system.

When the sled 10 has been unloaded, the wall system 112 may be folded so as to be positioned in the interior of the sled member 11 as seen in FIG. 4. The wall system 112 is moved from its upright portion to its folded position as will now be described. The brace 106 is disconnected from the support posts 62 and 78. The brace extending between support posts 70 and 86 is also disconnected. The support posts 62, 70, 78 and 86 are then pivotally moved from their upright position to their folded position with the wall system 112 being folded upon itself to reach the folded position of FIG. 4.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A decoy sled, comprising:
   a generally rectangular sled member having a front end, a rear end, a first side, a second side and an interior;
   said sled member including:
   (a) an upstanding front wall with an upper end, a lower end, a first end, a second end, an outer side and an inner side;
   (b) an upstanding rear wall with an upper end, a lower end, a first end, a second end, an outer side and an inner side;
   (c) an upstanding first side wall having an upper end, a lower end, a front end, a rear end, an outer side and an inner side;
   (d) said first side wall extending between said first ends of said front wall and said rear wall;
   (e) an upstanding second side wall having an upper end, a lower end, a front end, a rear end, an outer side and an inner side;
   (f) said second side wall extending between said second ends of said front wall and said rear wall;
   (g) a bottom wall extending between the lower ends of said front wall, said first side wall, said second side wall and said rear wall;
   (h) said upper ends of each of said front wall, said first side wall, said second side wall and said rear wall having a horizontally disposed flange extending outwardly therefrom;
   (i) a towing device extending from said forward end of said sled member;
   an elongated and vertically disposed first support post having upper and lower ends;
   said lower end of said first support post being pivotally secured to said inner side of said first side wall at said front end of said first side wall;
   said first support post being selectively pivotally movable between a vertically disposed position to a folded position in said interior of said sled member so as to be positioned adjacent said inner side of said front wall;
   an elongated and vertically disposed second support post having upper and lower ends;
   said lower end of said second support post being pivotally secured to said inner side of said first side wall at said rear end of said first side wall;
   said second support post being selectively pivotally movable between a vertically disposed position to a folded position in said interior of said sled member so as to be positioned adjacent said inner side of said rear wall;
   an elongated and vertically disposed third support post having upper and lower ends;
   said lower end of said third support post being pivotally secured to said inner side of said second side wall at said front end of said second side wall;
   said third support post being selectively pivotally movable between a vertically disposed position to a folded position in said interior of said sled member so as to be positioned adjacent said inner side of said front wall;
   an elongated and vertically disposed fourth support post having upper and lower ends;
   said lower end of said fourth support post being pivotally secured to said inner side of said second side wall at said rear end of said second side wall;
   said fourth support post being selectively pivotally movable between a vertically disposed position to a folded position in said interior of said sled member so as to be positioned adjacent said inner side of said rear wall;
   an elongated and horizontally disposed first support member having a front end and a rear end;
   said front end of said first support member being secured to said upper end of said first support post;
   said rear end of said first support member being secured to said upper end of said second support past;

an elongated and horizontally disposed second support member having a front end and a rear end;
said front end of said second support member being secured to said upper end of said third support post;
said rear end of said second support member being secured to said upper end of said fourth support post;
a flexible folding wall system comprising:
(a) a front wall member having an upper end, a lower end, a first end, a second end, an inner side and an outer side;
(b) a first side wall member having an upper end, a lower end, a front end, a rear end, an inner side and an outer side;
(c) a second side wall member having an upper end, a lower end, a front end, a rear end, an inner side and an outer side;
(d) a rear wall member having an upper end, a lower end, a first end, a second end, an inner side and an outer side;
said front wall member of said wall system extending between said first and third support posts;
said rear wall member of said wall system extending between said second and fourth support posts;
said first side wall member of said wall system extending between said first and second support posts;
said second side wall member of said wall system extending between said third and fourth support posts;
said upper end of said first side wall member of said wall system extending over said first support member and downwardly therefrom;
said upper end of said second side wall member of said wall system extending over said first support member and downwardly therefrom;
said lower end of said first side wall member of said wall system being positioned adjacent said upper end of said first side wall of said sled member;
said lower end of said second side wall member of said wall system being positioned adjacent said upper end of said second side wall of said sled member;
said lower end of said front wall member of said wall system being positioned adjacent said upper end of said front wall of said sled member;
said lower end of said rear wall member of said wall system being positioned adjacent said upper end of said rear wall of said sled member;
said wall system forming an upward extension of said front wall, said first side wall, said second side wall and said rear wall of said sled member when said first, second, third and fourth support posts are in their said vertically disposed positions;
said wall system being in a folded position in said interior of said sled member when said first, second, third and fourth support posts are in their said folded positions; and
structure for selectively maintaining said first, second, third and fourth supports in their said vertically disposed positions.

2. The decoy sled of claim 1 wherein said structure for selectively maintaining said first, second, third and fourth support posts in said upright position comprising:
(a) an elongated first brace having first and second ends which is selectively removably secured to said first and third support posts so as to extend therebetween; and
(b) an elongated second brace having first and second ends which is selectively removably secured to said second and fourth support posts so as to extend therebetween.

3. The decoy sled of claim 1 wherein a storage pocket having an open upper end is positioned at said inner side of said front wall member of said wall system.

4. The decoy sled of claim 1 wherein a storage pocket having an open upper end is positioned at said inner side of said first side wall member of said wall system.

5. The decoy sled of claim 1 wherein a storage pocket having an open upper end is positioned at said inner side of said second side wall member of said wall system.

6. The decoy sled of claim 1 wherein a storage pocket having an open upper end is positioned at said outer side of said rear wall member of said wall system.

7. The decoy sled of claim 1 wherein a pair of U-shaped decoy supports are positioned at said outer side of said first side wall member of said wall system each of which are configured to support a fully assembled spinning wing decoy therein.

8. The decoy sled of claim 1 wherein a pair of U-shaped decoy supports are positioned at said outer side of said second side wall member of said wall system each of which are configured to support a fully assembled spinning wing decoy therein.

9. The decoy sled of claim 1 wherein a gun support is positioned at said outer side of said first side wall member of said wall system.

10. The decoy sled of claim 1 wherein a gun support is positioned at said outer side of said second wall member of said wall system.

11. The decoy sled of claim 1 wherein a gun support is positioned at said outer side of said first side wall member of said wall system and wherein a gun support is positioned at said outer side of said second side wall member of said wall system.

12. The decoy sled of claim 4 wherein said storage pocket is configured to receive silhouette decoys therein.

13. The decoy sled of claim 5 wherein said storage pocket is configured to receive silhouette decoys therein.

14. A decoy sled, comprising:
a generally rectangular sled member having a front end, a rear end, a first side, a second side and an interior;
said sled member including:
(a) an upstanding front wall with an upper end, a lower end, a first end, a second end, an outer side and an inner side;
(b) an upstanding rear wall with an upper end, a lower end, a first end, a second end, an outer side and an inner side;
(c) an upstanding first side wall having an upper end, a lower end, a front end, a rear end, an outer side and an inner side;
(d) said first side wall extending between said first ends of said front wall and said rear wall;
(e) an upstanding second side wall having an upper end, a lower end, a front end, a rear end, an outer side and an inner side;
(f) said second side wall extending between said second ends of said front wall and said rear wall;
(g) a bottom wall extending between the lower ends of said front wall, said first side wall, said second side wall and said rear wall;
(h) said upper ends of each of said front wall, said first side wall, said second side wall and said rear wall having a horizontally disposed flange extending outwardly therefrom; and
(i) a towing device extending from said forward end of said sled member;

an elongated and vertically disposed first support post having upper and lower ends;

said lower end of said first support post being pivotally secured to said inner side of said first side wall at said front end of said first side wall;

said first support post being selectively pivotally movable between a vertically disposed position to a folded position in said interior of said sled member so as to be positioned adjacent said inner side of said front wall;

an elongated and vertically disposed second support post having upper and lower ends;

said lower end of said second support post being pivotally secured to said inner side of said first side wall at said rear end of said first side wall;

said second support post being selectively pivotally movable between a vertically disposed position to a folded position in said interior of said sled member so as to be positioned adjacent said inner side of said rear wall;

an elongated and vertically third support post having upper and lower ends;

said lower end of said third support post being pivotally secured to said inner side of said second side wall at said front end of said second side wall;

said third support post being selectively pivotally movable between a vertically disposed position to a folded position in said interior of said sled member so as to be positioned adjacent said inner side of said front wall;

an elongated and vertically disposed fourth support post having upper and lower ends;

said lower end of said fourth support post being pivotally secured to said inner side of said second side wall at said rear end of said second side wall;

said fourth support post being selectively pivotally movable between a vertically disposed position to a folded position in said interior of said sled member so as to be positioned adjacent said inner side of said rear wall;

an elongated and horizontally disposed first support member having a front end and a rear end;

said front end of said first support member being secured to said upper end of said first support post;

said rear end of said first support member being secured to said upper end of said second support post;

an elongated and horizontally disposed second support member having a front end and a rear end;

said front end of said second support member being secured to said upper end of said third support post;

said rear end of said second support member being secured to said upper end of said fourth support post;

a flexible folding wall system comprising:
 (a) a front wall member having an upper end, a lower end, a first end, a second end, an inner side and an outer side;
 (b) a first side wall member having an upper end, a lower end, a front end, a rear end, an inner side and an outer side;
 (c) a second side wall member having an upper end, a lower end, a front end, a rear end, an inner side and an outer side;
 (d) a rear wall member having an upper end, a lower end, a first end, a second end, an inner side and an outer side;

said front wall member of said wall system extending between said first and third support posts;

said rear wall member of said wall system extending between said second and fourth support posts;

said first side wall member of said wall system extending between said first and second support posts;

said second side wall member of said wall system extending between said third and fourth support posts;

said upper end of said first side wall member of said wall system extending over said first support member and downwardly therefrom;

said upper end of said second side wall member of said wall system extending over said second support member and downwardly therefrom;

said lower end of said first side wall member of said wall system being positioned adjacent said upper end of said first side wall of said sled member;

said lower end of said second side wall member of said wall system being positioned adjacent said upper end of said second side wall of said sled member;

said lower end of said front wall member of said wall system being positioned adjacent said upper end of said front wall of said sled member;

said lower end of said rear wall member of said wall system being positioned adjacent said upper end of said rear wall of said sled member;

said wall system forming an upward extension of said front wall, said first side wall, said second side wall and said rear wall of said sled member when said first, second, third and fourth support posts are in their said vertically disposed positions;

said wall system being in a folded position in said interior of said sled member when said first, second, third and fourth support posts are in their said folded positions; and structure for selectively maintaining said first, second, third and fourth supports in their said upright vertically disposed positions;

a first storage pocket having an open upper end positioned at said inner side of said front wall of said wall system;

a second storage pocket having an open upper end positioned at said inner side of said first side wall member of said wall system;

a third storage pocket having an open upper end positioned at said inner side of said second wall member of said wall system; and a fourth storage pocket having an open upper end positioned at said outer side of said rear wall member of said wall system.

15. The decoy sled of claim 14 wherein a gun support is positioned at said outer side of said first side wall member of said wall system.

16. The decoy system of claim 14 wherein a gun support is positioned at said outer side of said second side wall member of said wall system.

17. The decoy sled of claim 14 wherein a pair of U-shaped decoy supports are positioned at said outer side of said first side wall member of said wall system each of which are configured to support a fully assembled spinning wing decoy therein.

18. The decoy sled of claim 14 wherein a pair of U-shaped decoy supports are positioned at said outer side of said second side wall member of said wall system each of which are configured to support a fully assembled spinning wing decoy therein.

19. The decoy sled of claim 14 wherein a hitch member is secured to said rear wall of said sled member.

20. The decoy sled of claim 1 wherein a hitch member is secured to said rear wall of said sled member.

* * * * *